J. A. WERNER.
CASH AND AUTOGRAPHIC REGISTER.
APPLICATION FILED MAR. 3, 1910.
1,131,759.
Patented Mar. 16, 1915.
7 SHEETS—SHEET 1.
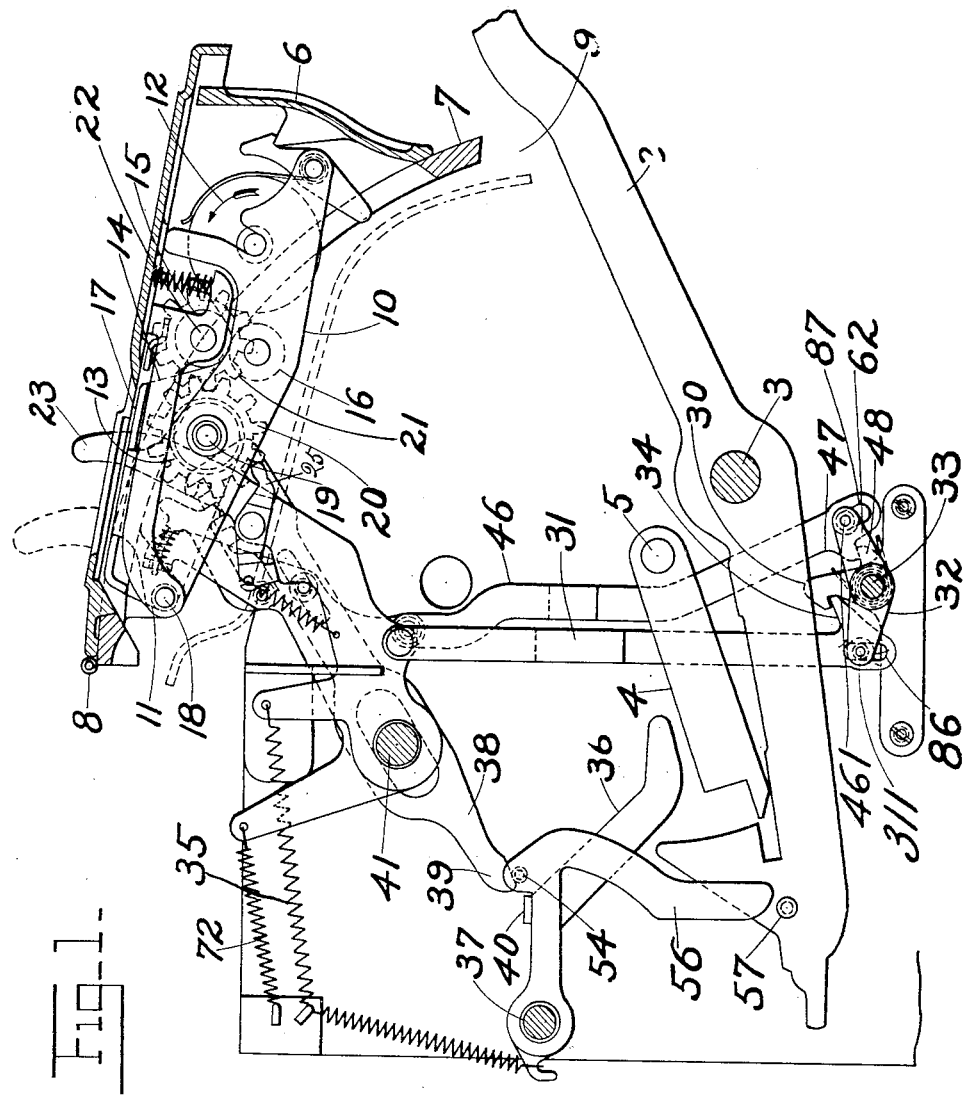

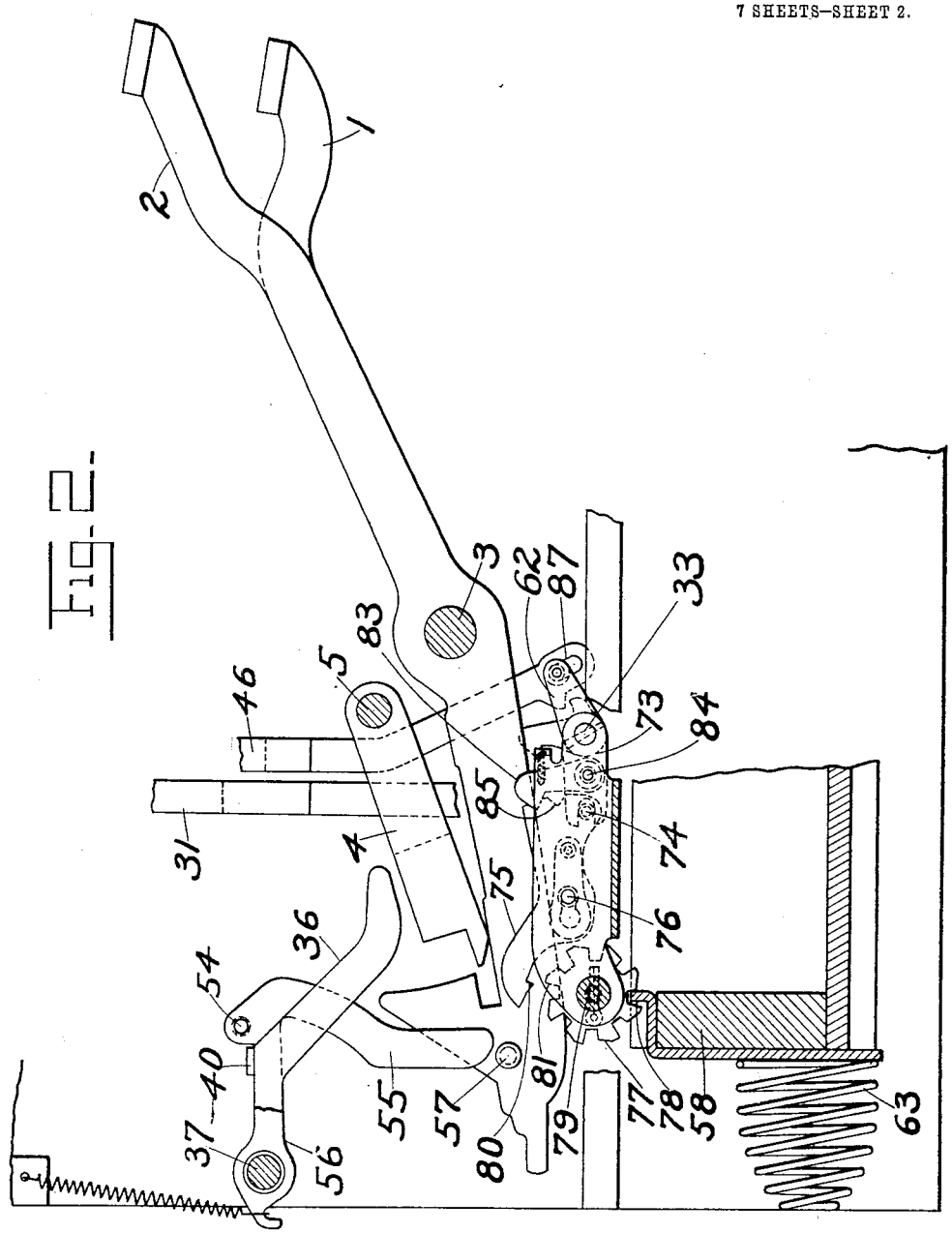

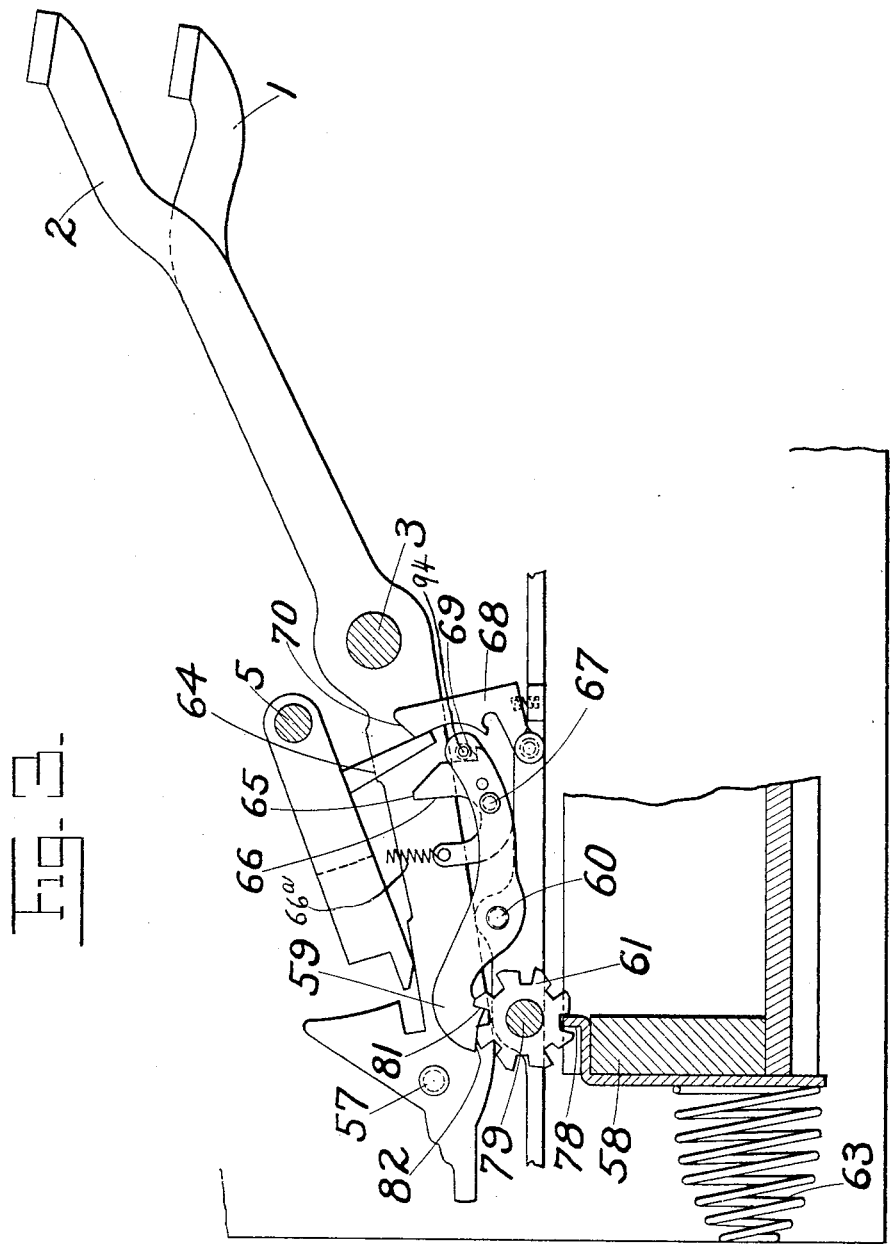

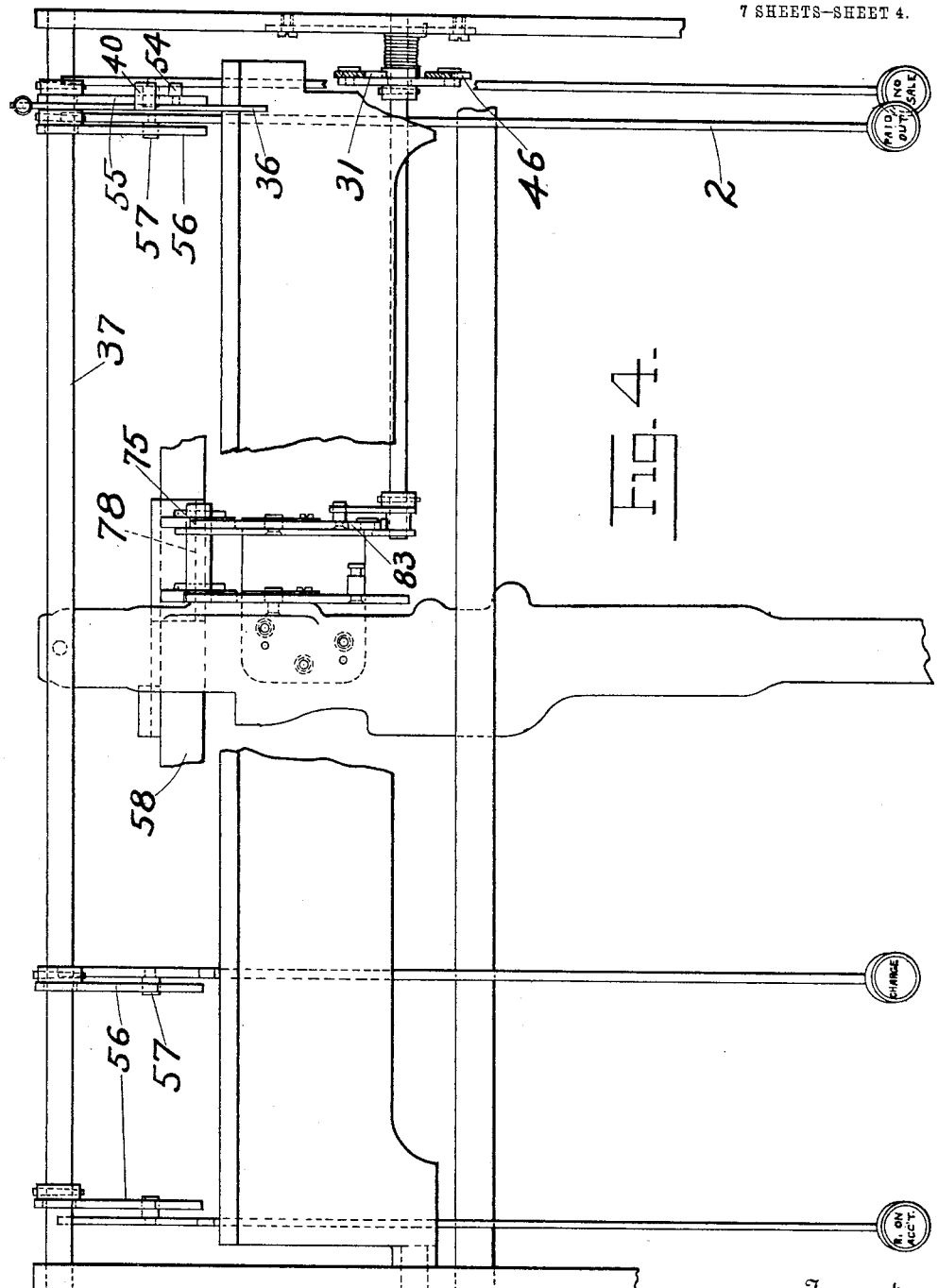

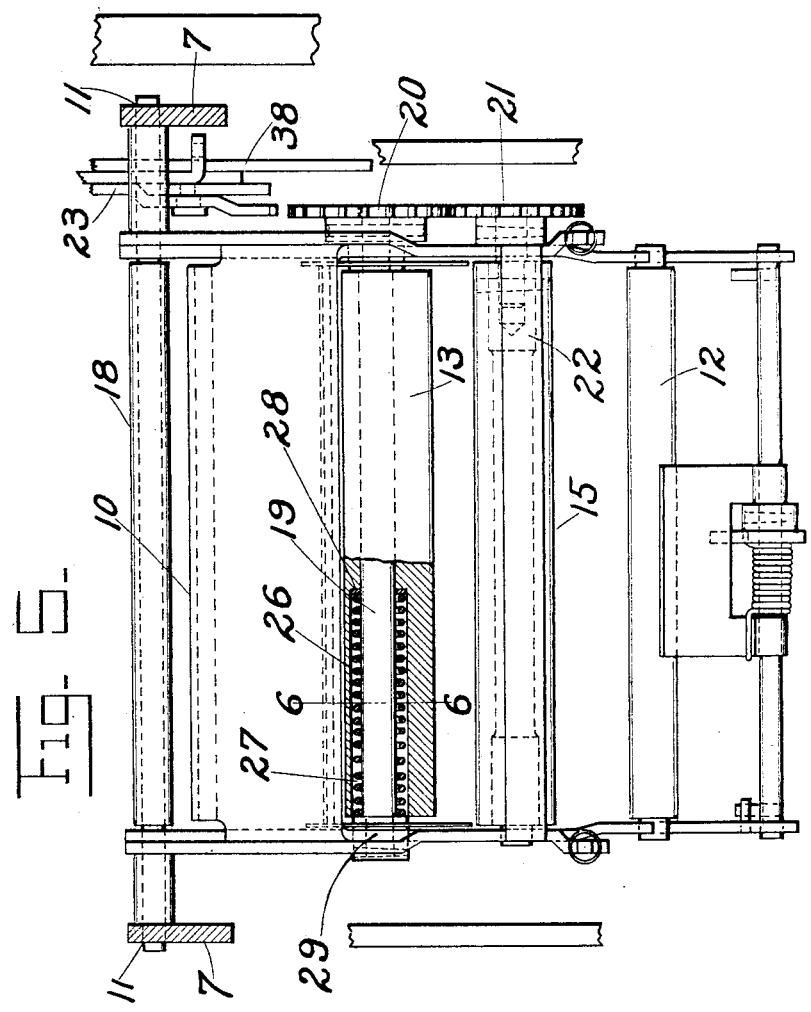
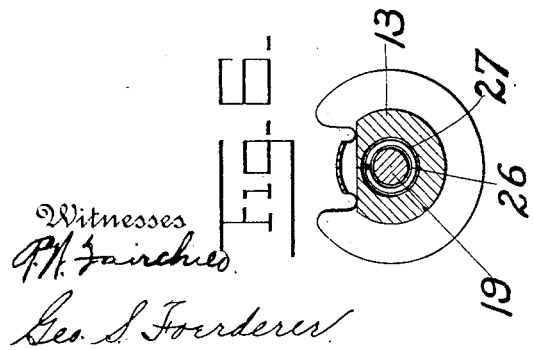

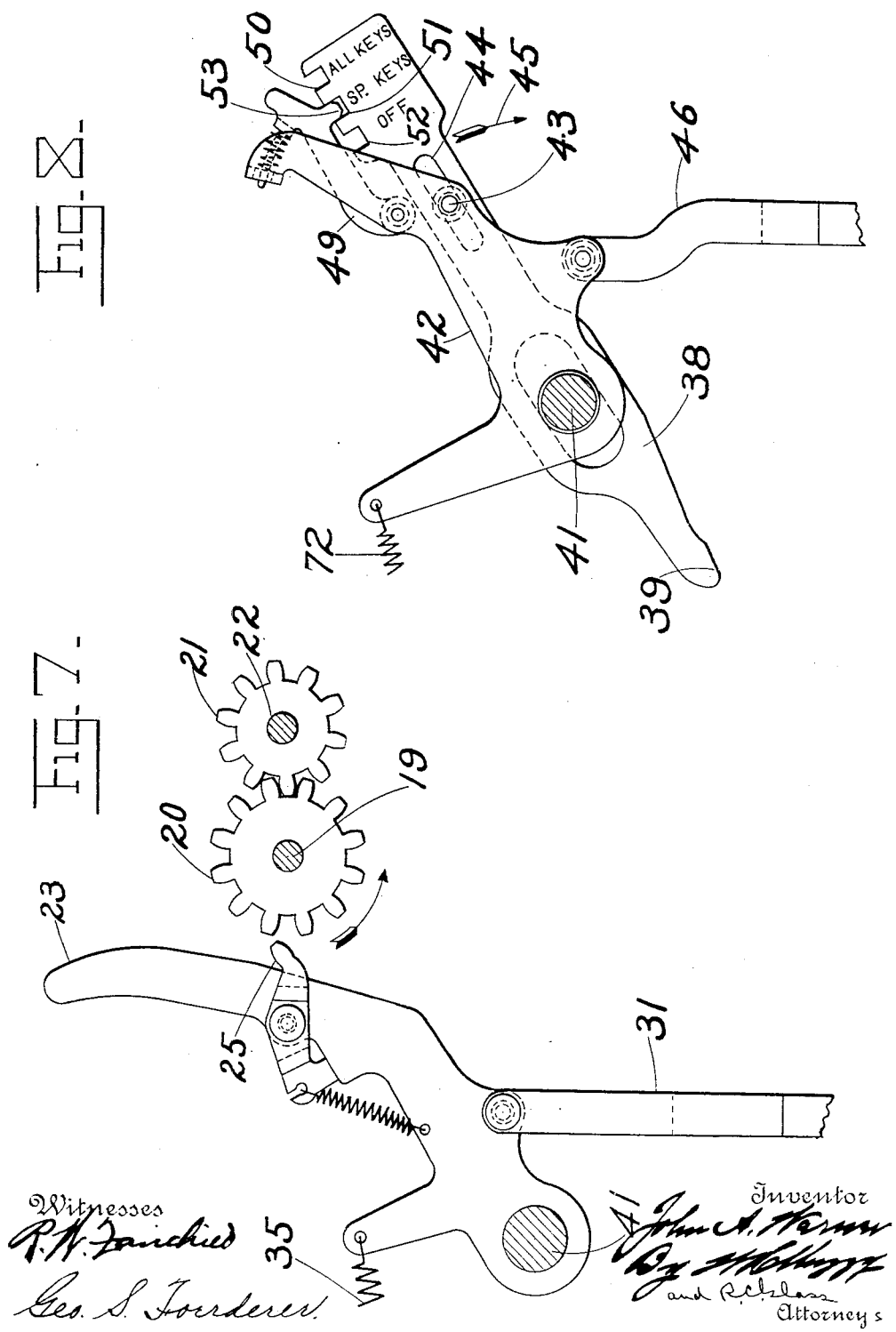

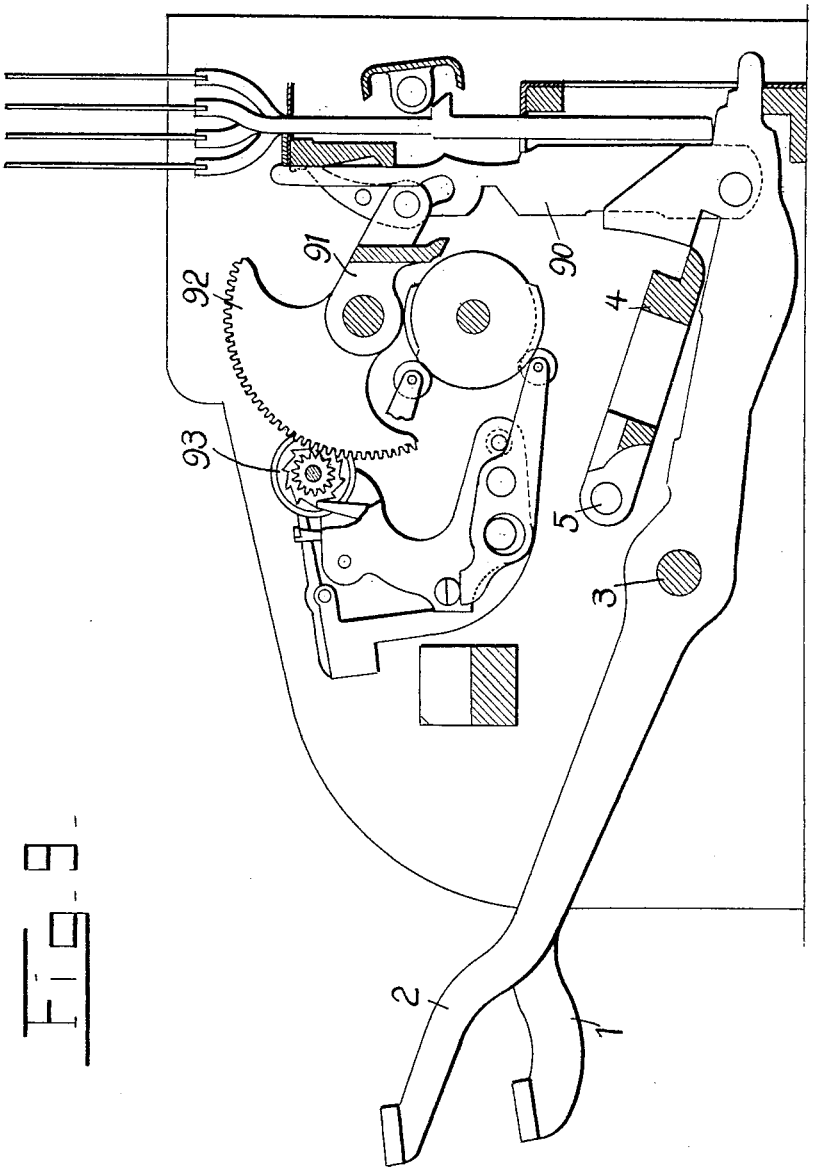

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,131,759.  Specification of Letters Patent.  Patented Mar. 16, 1915.

Application filed March 3, 1910. Serial No. 546,980.

*To all whom it may concern:*

Be it known that I, JOHN A. WERNER, a citizen of the United States, residing at Dayton, in the county of Montgomery and State of Ohio, have invented certain new and useful Improvements in Cash and Autographic Registers, of which I declare the following to be a full, clear, and exact description.

This invention relates to cash registers, and particularly to cash registers combined with autographic devices, and having interlocking mechanism between the two devices which normally prevents an operation of the autographic device until the register is operated and also prevents the opening of the cash drawer until the autographic device is operated.

In various prior patents and applications autographic attachments to cash registers of different types have been disclosed, but in nearly all such prior devices, the autographic attachment has been operated by connections from the keys or other operating elements of the register. While the operation of an autographic attachment may not unduly load a main operating device, such as a crank handle, nevertheless the additional work required becomes burdensome when the machine is of the type wherein the keys furnish motive power for the whole machine. It is this latter type of register for which the present invention is mainly designed, and to that end the feeding devices of the autographic attachment are constructed to be operated by a separate handle, thus throwing no additional work on the keys. Mechanism is, however, provided whereby the register keys may maintain a control over the actuation of this separate handle, such mechanism comprising means for releasing the handle and at the same time locking the cash drawer. To release the cash drawer an operation of the separate handle is necessary.

The register shown is of the single motion, key operated type shown and described in United States Letters Patent, No. 790,104 granted May 16th, 1905, to Thomas Carney and is adapted to record transactions by the mere depression of a single key or combination of keys. If a cash sale is recorded the depression of the value keys representing the amount of the sale suffices for the complete operation of the machine. If other than cash transactions are recorded the depression of the correct value keys in combination with one of the special transaction keys causes the correct operation of the machine.

The cash register is adapted to record transactions by printing, indicating, counting and totalizing, but the particular devices employed for accomplishing these results are not illustrated in the drawings as the invention relates to the autographic attachment and its connection with the main operating mechanism of the register.

With these and incidental objects in view the invention consists in certain novel features of construction and combinations of parts, the essential elements of which are set forth in appended claims and a preferred form of embodiment of which is hereinafter described with reference to the drawings which accompany and form part of the specification.

Of said drawings: Figure 1 is a transverse vertical section of the register and autographic device. Fig. 2 is a detail in side elevation of part of the drawer release mechanism. Fig. 3 is another side elevation of part of the drawer release mechanism. Fig. 4 is a top plan view of the main operating mechanism of the register showing the drawer releasing device and its connection to the autographic attachment. Fig. 5 is a top plan view of the autographic attachment partly broken away and with the casing omitted. Fig. 6 is a sectional detail of the receiving roll of the autographic attachment taken on a line 6—6. Fig. 7 is a detail in side elevation of the paper feeding mechanism of the autographic attachment. Fig. 8 is a detail in side elevation of an adjustable device by means of which an operation of the autographic attachment may be compelled on certain operations of the register, before it is possible to open the cash drawer. Fig. 9 is a sectional view showing the registering mechanism of the illustrative machine.

Referring to the drawings, the value keys 1 and the special transaction keys 2 are all loosely pivoted upon a shaft 3 and co-act with a key-coupler 4 which is pivoted to the frames of the machine by pins 5. The keys and the key-coupler co-act in such a way that the initial movement of the keys upon the depression of a combination of keys serves to lock these keys to the key-coupler and also lock the remaining keys against depression.

Pivoted to the rear end of each key 1 is one of a series of graduated standards 90 (Fig. 9) for coöperating with registering frames 91 and segments 92 to rotate the totalizer wheels 93 the correct number of divisions to represent the values of the keys depressed. Any detailed information regarding this particular mechanism can be secured by reference to the Carney patent above cited.

The autographic mechanism is contained within a casing 6 which is fastened to the machine lid 7. The lid 7 is hinged to the cabinet of the machine by a pin 8 and at 9 may be provided with a lock for the purpose of locking the lid in its closed position thereby preventing access to the autographic mechanism. A frame 10 is pivoted within the casing 6 on a pin 11. Mounted within this frame are a paper supply roll 12 and a paper receiving roll 13. The autographic paper 14 leads from the roll 12 between feed rolls 15 and 16, over a writing platform 17 and around a roll 18 to the receiving roll 13.

A shaft 19 upon which the receiving roll is journaled carries a gear 20, Figs. 1 and 7. The gear 20 meshes with a gear 21 which is secured to a carrying shaft 22 for the feed roll 15. The feed roll 15 is in frictional engagement with the feed roll 16, therefore the rotation of the feed roll 15 causes the rotation of the feed roll 16. In order to rotate the feed rolls a handle 23 is rocked downwardly around its pivot rod 41 causing a pawl 25 which is carried by the handle to engage the teeth of the gear 20 thereby rotating the gear one tooth space.

The receiving roll 13 is loosely journaled on the shaft 19, but is held in frictional engagement with the shaft by a spring 26 (Fig. 5) which is contained within a recess 27 of the roll and is compressed between the end 28 of the recess and a collar 29 on the shaft 19. The diameter of the roll 13 being greater than the diameters of the rolls 15 and 16 the peripheral movement of the roll 13 upon the operation of the handle 23, would ordinarily be greater than the peripheral movement of either of the feed rolls 15 and 16, but as the roll 13 is merely held in frictional engagement with its shaft 19 it will be prevented from rotating an equal angular extent with the shaft 19 by the drag of the autographic paper, the feed of which is regulated by the rolls 15 and 16. It will be understood that the rolls 15 and 16 are rotated an extent which does not vary upon successive operations of the machine, and thus there is no variation in the feed of the autographic paper. If the feed of the autographic paper depended entirely upon the rotation of the roll 13 and if this roll were fixed to its shaft 19 the extent of feed of the paper would gradually be increased as the diameter of the roll 13 becomes greater, because of the autographic paper being wound around this roll, but by means of the arrangement here referred to a very simple and accurate paper feed equalizing device is provided.

A locking device is provided which normally prevents an operation of the handle 23 until the machine is operated by the depression of one of the value keys or one of the special transaction keys. This locking device comprises a hook 30 and a link 31 having a slot 86 surrounding a roller 311 fast on an arm 32 secured to a shaft 33 (Fig. 1), the link 31 being also connected to handle 23. The normal position of the handle 23 is shown in full lines in Fig. 1 with the hook 30 engaging a nose 34 of the link 31. In order to operate the feed mechanism of the autographic device the hook 30 must first be rocked away from the nose 34 permitting the handle 23 to be drawn by a spring 35 to the position in which it is shown in Fig. 7 and also in dotted lines in Fig. 1. Then the autographic device may be operated merely by rocking the handle 23 downwardly.

In order to rock the pawl 30 away from the co-acting nose 34 an operation of the machine is necessary, as the key-coupler 4 co-acts with an arm 36 which is loosely carried by a shaft 37 and which co-acts with an adjustable slide 38. If the slide 38 is in such position that the rear end 39 thereof is in the path of movement of a shoulder 40 on the arm 36, the slide will be rocked around rod 41 upon the rise of the arm 36. The slide 38 is slidingly secured to an arm 42 (Fig. 8) by a pin 43 which extends from arm 42 through a slot 44 in the slide 38 and when the slide 38 is rocked in the direction indicated by the arrow 45, the arm 42 rocks with the slide and pushes a link 46 connected to said arm downwardly. The link 46 (Fig. 1) has a slot 87 therein surrounding a roller 461 carried by an arm 48 fast on shaft 33 and is provided with a nose 47 which co-acts with a nose 62 of the pawl 30 for the purpose of rocking the pawl 30 away from the nose 34 when the link 46 is moved downwardly. As soon as the pawl 30 is clear of the nose 34 the handle 23 rocks rearwardly to the posititon in which it is shown in Fig. 7. The paper feed mechanism of the autographic attachment may then be operated.

The slide 38 is adjustable in a lineal direction for the purpose of permitting an operation of the autographic attachment when any key is depressed, whether value or special, or only when one of the special transaction keys is depressed, or to prevent an operation of the autographic device at all times regardless of any operation of the cash register. The slide 38 is ordinarily inaccessible as it is contained within the machine below the lid 7 which may be locked to the cabinet at 9 as hereinbefore stated. By this construction the owner of the machine may, by setting the slide 38 to one of the positions mentioned, prevent the operators of the machine from using the autographic attachment at all, or permit operation only when special keys are depressed, or permit the operators to use the autographic attachment upon any operation of the machine, but the arrangement is such that the autographic attachment cannot be operated independently of an operation of the machine.

For the purpose of retaining the slide 38 in any of its set positions the arm 42 carries a pawl 49 and the slide is provided with co-acting notches 50, 51 and 52. If the slide 38 is in such position that the notch 50 is opposite a nose 53 of the pawl, the rear end 39 of the slide will be in the path of movement of the shoulder 40 of the arm 36. The arm 36 is rocked upwardly at every operation of the machine and thus when the slide 38 is in the position stated, the hook 30 will be rocked away from the nose 34 upon each operation of the machine thereby permitting the operation of the paper feeding mechanism of the autographic device.

When the adjustable slide 38 is in such position that the nose 53 of the pawl 49 (Fig. 8) is in the notch 51 of the slide, the rear end 39 of the slide will be out of the path of movement of the shoulder 40 of the arm 36 but over a pin 54 on an arm 55 which is fixed to the shaft 37. The shaft 37 carries a plurality of arms 56 also fast thereon (Fig. 4) which are similar to the arm 55, but not provided with pins 54. There is an arm 55 or 56 for each special transaction key and in such position as to be engaged by a pin 57 on its respective key when the key is depressed. As the arms 55 and 56 are all carried by the shaft 37, the depression of any one special transaction key will cause the shaft 37 to be rocked on its axis, and when the shaft is so rocked, the pin 54 engages the end 39 of the slide 38, rocking the same around its pivot on rod 41 and thereby causing the link 46 to be lowered, thus unlatching the handle 23. The slide 38 is shown in its central position in Fig. 1 with the end 39 of the slide in co-acting relation with the pin 54. It may be seen from this figure that when the slide is in this position the depression of value keys alone will not cause the slide to be rocked around its pivot rod 41 as the end 39 of the slide is not in the path of movement of the shoulder 40 on the arm 36. For this reason, if value keys alone are depressed the autographic mechanism remains in its locked condition.

By shifting the slide 38 so that the nose 53 of the pawl 49 is in the notch 52 of the slide, the end 39 of the slide will be brought out of the path of movement of both the shoulder 40 and the pin 54; therefore when the slide is in this position, the autographic device will remain locked regardless of any operation of the register.

The cash drawer 58 (Figs. 2 and 3) is normally locked in its closed position by a pawl 59 (Fig. 3) which is pivotally mounted on a pin 60 on the frame of the machine and normally engages a toothed wheel 61 which is pivotally mounted on the frame of the machine and co-acts with a metallic lug 78 carried by the rear wall of the cash drawer. The cash drawer is normally urged to its open position by springs 63, and by raising the pawl 59 out of engagement with the toothed wheel 61, rotation of the wheel is ordinarily no longer prevented and consequently the springs 63 are permitted to act. This drawer locking device is operated by a pin 64 which is carried by the key-coupler 4 and when the key-coupler nears its lower or initial position at the completion of an operation of the machine, the pin 64 engages a surface 65 of a pawl 66 which is pivoted to the pawl 59 on pin 67, causing the pawl 59 to rock away from the toothed wheel 61 and thus no longer detain the drawer. A pin 94 in the forward end of the pawl 59 acts as a stop against which pawl 66 is normally held by the tension of the spring 66$^a$. This rocking of pawl 59 also lowers the pawl 66 enough to permit a pawl 68 to rock rearwardly into engagement with a shoulder 69 of the pawl 66 thereby holding the pawl 66 in its moved position and consequently the pawl 59 in its moved position thus insuring that the pawl 59 will not immediately drop into engagement with the toothed wheel 61 and prevent the opening of the cash drawer. After the pin 64 engages the pawl 66 the pin 64 is carried slightly further in a downward direction before the key-coupler 4 comes to rest. This further movement of the key-coupler causes the pin 64 to engage the pawl 68 at 70 rocking the same out of engagement with the pawl 66 and thereby permitting the pawl 59 to rock into engagement with the toothed wheel 61 so that when the drawer is moved back to its inner position it will be latched in such position. On the upstroke of the key coupler pin 64 idly wipes by pawl 66 as permitted by spring 66$^a$ extended between the pawl and a fixed machine frame tie-bar located above the key coupler but not shown.

The handle 23 by means of which the autographic feeding mechanism is operated, controls the release of another drawer latch which is somewhat similar to the drawer latch just described, but serves to prevent the opening of the drawer until the handle 23 has been operated after the machine has been operated in such way that the handle 23 becomes unlocked. Or, in other words, this latch is set by the slide 38 to prevent the opening of the cash drawer whenever the slide is rocked around its pivot, and is then unlatched by an operation of the handle 23. The rocking of the slide depends upon its lineal setting, as previously described. Referring to Fig. 1, it may be seen that when the slide 38 is rocked it pushes the link 46 downwardly and the handle 23 springs backward under the action of the spring 35 from its normal position to the position in which it is shown in Fig. 7. The link 46 has a pin and slot connection to an arm 62 fast on shaft 33, and thus rocks the said shaft as the link descends. The shaft 33 also carries an arm 73 (Fig. 2) which is forked over a pin 74 fixed to the rear end of a pawl 75. The upward movement of the arm 73 causes the pawl 75 to rock around its pivot 76 into engagement with the toothed wheel 77 and thereby prevent the releasing of the cash drawer as the toothed wheel co-acts with the lug 78.

On operations of the machine in which the link 46 is pushed downwardly, the link moves downwardly upon the rise of the key-coupler or the depression of a special key, causing the pawl 75 to engage the toothed wheel 77, while the pin 64 (Fig. 3) does not cause the pawl 59 to be disengaged from the toothed wheel 61 until the key-coupler nears its home position. Thus when the machine is operated in the manner described, the drawer 58 will not open when the pawl 59 is moved out of engagement with the toothed wheel 61 as the pawl 75 is then in engagement with the toothed wheel 77. The wheels 61 and 77 are both loose on a rod 79, and side by side, but the active point 80 of pawl 75 is slightly forward of the corresponding point 81 of the pawl 59. Thus when pawl 59 is disengaged from wheel 61 the drawer under the force of spring 63 moves slightly forward thus rotating wheel 77 until the edge 81 of a tooth of this wheel engages point 80 of pawl 75. Therefore, as wheel 61 is also slightly rotated the pawl 59 will, when released from hook latch 68, drop on the next tooth of wheel 61 and thus the drawer cannot be accidentally locked by pawls 59. To rock pawl 75 away from wheel 77 the handle 23 is drawn back to normal position, thus moving link 31 downwardly causing arm 73 to rock pawl 75 away from the locking wheel 77.

The mechanism which is described above provides means for locking the cash drawer in its closed position until the paper feeding mechanism of the autographic device has been operated and in connection with the slide 38 this means may be regulated so that an operation of the autographic device is essential only upon certain operations of the machine in order to open the cash drawer. Provision is made for entirely disconnecting the autographic device from the cash register by moving the slide 38 to its outer position as previously described, but the autographic device is normally locked in whatever position the slide 38 may be in. A spring pressed pawl 83 is pivoted to the frame of the machine by a pin 84 and co-acts with notches 85 in the pawl 75 for the purpose of alining the pawl in either of its set positions. Slots 86 and 87 (Fig. 1) in the links 31 and 46 are for the purpose of preventing interference with the rocking of the shaft 33. The operation of this drawer controlling mechanism is simple and may be briefly recapitulated as follows: Assuming the slide 38 is set so as to be operative, a depression of the proper keys will cause this slide to rotate around its pivot rod 41, thus depressing link 46 and rocking arm 62 and shaft 33, inasmuch as roller 461 is in the upper end of slot 87. The depression of link 46 both withdraws latch 30 from a position wherein it retains the separate handle 23 against movement, and depresses pawl 75 into position to lock the cash drawer, through the rocking of shaft 33. As soon as latch 30 releases the link 31, the spring 35 moves handle 23 to the position shown in Fig. 7, thus carrying slot 86 past roller 311 until the lower end of this slot surrounds the roller. Further operation of the keys will restore link 46 to its upper position but without moving the pawl 75 inasmuch as the upward movement of link 46 will merely carry slot 87 past the roller 461.

To release the cash drawer an operation of handle 23 is necessary, and such operation will again depress link 31, thus rocking shaft 33 and withdrawing locking pawl 75 from locking position. When the link 31 reaches its lowest position it will be caught and held by latch 30, and the parts thus assume their normal positions.

As the machine has been described the operation of the keys both releases the separate manipulative lever and forces an auxiliary latch into latching relation with the cash drawer, so that an operation of the hand lever is necessary to obtain access to the compartments in the cash receptacle. It will be obvious, however, that a construction for latching the feeding lever until keys are operated is of utility even without the use of the drawer latching mechanism or in cases where the particular use of the registering mechanism does not require the employment of a cash receptacle. Such a construction is considered to be within the scope of the invention and is intended to be covered by certain of the claims. So, also, the hand lever may well actuate many other types of accounting mechanism and its use is not limited to the autographic device shown and described herein.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is:

1. In a machine of the class described, the combination with a cash receptacle, and means, normally in releasing position, for latching said receptacle, of keys, and connections operated thereby for moving said latching means to latching relation, and a device for feeding an autographic strip, with connections from said device for withdrawing said latching means from latching relation.

2. In a machine of the class described, the combination with a cash receptacle, and means, normally in releasing position for latching said receptacle, of a series of keys, and connections, including a lever operated by said keys, for moving said latching means to latching position, a lever for feeding an autographic strip, and connections from said lever for withdrawing said latching means from latching relation.

3. In a machine of the class described, the combination with a cash receptacle, and a latch, normally in releasing position for latching said receptacle, of a series of keys, a lever for feeding an autographic strip and devices normally locking said lever, connections from said keys for moving said latch to latching position and for releasing said lever locking devices, and connections from said lever for moving said latch to releasing position.

4. In a machine of the class described, the combination with a cash receptacle, and a main latching device for the same normally in latching position, of a series of keys, a lever and connections for feeding an autographic strip, means controlled by the keys for releasing said main latching device, an auxiliary receptacle latching device normally in releasing position, devices operated from said keys for moving said auxiliary latching device to latching position, and connections from said lever for restoring said auxiliary latching device to releasing position.

5. In a machine of the class described, the combination with a cash receptacle and a latching means therefor normally in releasing position, of a series of keys and connections therefrom for moving said latching means to latching relation, a manipulative device having connections to withdraw said latching means from latching relation, and devices controlled by said keys normally preventing movement of said manipulative device.

6. In a machine of the class described, the combination with a cash receptacle, and means, normally in releasing position for latching the same, of keys for moving said latching means to latching relation, a manipulative device having connections to withdraw said latching means from latching relation, and a lock for said manipulative device actuated by the keys.

7. In a machine of the class described, the combination with a cash receptacle, and means, normally in releasing position for latching said receptacle, of a lever connected to said latching means, a series of keys having connections to move said lever in one direction and thereby move said latching means to latching position, devices for feeding an autographic strip, and connections from said devices for moving said lever in a reverse direction and thus withdrawing said latching means from latching position.

8. In a machine of the class described, the combination with a cash receptacle, and means, normally in releasing position, for latching said receptacle, of a movable element connected to said latching means, manipulative devices connected to move said element in one direction and thereby move said latching means to latching position, devices for feeding an autographic strip, and connections from said devices for moving said element in the reverse direction and thus withdrawing said latching means from latching position.

9. In a machine of the class described, the combination with a registering mechanism, of a series of register controlling value keys, an autographic attachment having feeding devices, a manipulative device for operating said feeding devices, means controlled by said keys normally preventing operation of said manipulative device, a movable cash drawer, and a drawer latch constructed to require an operation of said manipulative device to release the drawer latch when no value key is operated.

10. In a machine of the class described, the combination with a registering mechanism including a series of keys, of an autographic attachment thereto having paper feeding devices, a spring controlled hand lever connected to actuate said feeding devices, and a latch normally locking said lever in inoperative position controlled by said keys for the purpose of permitting said spring to drive said lever to operative position.

11. In a machine of the class described, the combination with a registering mechanism including a series of keys, of an autographic attachment thereto having feeding devices, a manipulative device connected to actuate said feeding devices and means for latching said manipulative device, and connections, from said keys and including a manually shiftable element, for operating said latching means.

12. In a machine of the class described, the combination with a registering mechanism including keys, of an autographic attachment thereto having feeding devices, a hand lever connected to operate said feeding devices, means for latching said hand lever against operation, a lever operated by said keys, and connections for operating said hand lever latching means, and including an element manually shiftable into or out of operative relation with said key operated lever.

13. In a machine of the class described, the combination with a registering mechanism, of a series of register controlling value keys, an autographic attachment having feeding devices, a manipulative device for operating said feeding devices, a latch for said manipulative devices controlled by said keys, a movable cash drawer, and a drawer latch constructed to require an operation of said manipulative device when no value key is operated to release said latch.

14. In a machine of the class described, the combination with a normally inexposed cash receptacle, of keys and connections operated thereby to prevent exposure of the cash receptacle, a device for feeding a record strip with connections from said device for exposing the cash receptacle.

15. In a machine of the class described, the combination with a cash receptacle, and means, normally in releasing position for latching the same, of keys for moving said latching means to latching relation, and a manipulative device having connections to withdraw said latching means from latching relation.

16. In a machine of the class described, the combination with a registering mechanism, of depressible keys and connections operated thereby for actuating the registering mechanism, of an autographic attachment thereto having feeding devices, a manipulative device for operating said feeding devices, and means, controlled by said keys, normally preventing operation of said manipulative device.

17. In a machine of the class described, the combination with a registering mechanism, of a series of register controlling manipulative devices, an independent manipulative device, means controlled by said register controlling manipulative devices normally preventing operation of said independent manipulative device, a movable cash drawer, and a drawer latch constructed to require an operation of said independent manipulative device to release the drawer.

18. In a machine of the class described, the combination with accounting mechanism; of key actuated mechanism for operating the same; a cash receptacle; means, normally in releasing position, for latching said receptacle; connections from said key actuated mechanism for moving said latching means to latching relation; and a device for feeding a record strip, with connections from said device for withdrawing said latching means from latching relation.

19. In a machine of the class described, the combination with an operating means therefor; of a supply roll and a storage roll for a record strip; a feeding means for the record strip comprising two feed rolls and a drive shaft for the storage roll, said feed rolls and drive shaft being given invariable extents of movement by operations of the operating means; and a spring arranged to give a yielding connection between the storage roll and its drive shaft, whereby a variable extent of movement of the storage roll is permitted.

20. In a machine of the class described, the combination with a register operating mechanism; of an autographic attachment thereto having feeding devices; a manipulative device for operating said feeding devices, a normally inaccessible receptacle; and adjustable means whereby an operation of both the register operating mechanism and said manipulative device may be required to render the receptacle accessible.

21. In a machine of the class described, the combination with an operating mechanism comprising special keys; of an autographic attachment to said operating mechanism having feeding devices; a manipulative device for operating said feeding devices; a normally inaccessible receptacle; and adjustable means whereby an operation of both the special keys and said manipulative device may be required to render the receptacle accessible.

22. In a machine of the class described, the combination with an operating mechanism; of an autographic attachment thereto, having feeding devices; a normally inoperable manipulative device for operating said feeding devices; and means requiring an operation of the operating mechanism for rendering said manipulative device operable.

23. In a machine of the class described, the combination with a supply roll and the storage roll for the record strip, of feeding devices for the record strip, a rotatable shaft supporting the storage roll and connected to drive the feeding devices, a manipulative device arranged to give the rotatable shaft and the feeding devices an invariable extent of movement, and yielding connections between the rotatable shaft and the storage roll permitting rotation of the shaft independent of the storage roll, the extent of such independent rotation being determined by the amount of record strip accumulated on the storage roll.

24. The combination with a registering mechanism comprising a series of manipulative devices, of an autographic attachment to said registering mechanism comprising paper feeding devices, manipulative means for actuating the feeding devices, and connections requiring the operation of one of the manipulative devices as a preliminary to manipulation of the feeding device actuating means.

25. The combination with a registering mechanism of an autographic attachment thereto comprising paper feeding devices, manipulative means for actuating the feeding devices, a cash receptacle, latching devices for the cash receptacle operated by the registering mechanism and the aforesaid manipulative device, and connections compelling the operation of the registering mechanism and the manipulative devices in an invariable sequence to unlatch the cash receptacle.

26. The combination with a registering mechanism comprising a plurality of manipulative devices, of an autographic attachment to said registering mechanism comprising paper feeding devices, manually operable means for actuating the feeding devices, a cash receptacle, latching devices for the cash receptacle and connections requiring the operation of the manipulative devices and the manually operable means in an invariable sequence to release the drawer latching devices.

27. The combination with a registering mechanism comprising a plurality of keys, of an autographic attachment to said mechanism comprising paper feeding devices, a plurality of latches for the receptacle, and connections requiring operations of the keys and the manipulative means in an invariable sequence to unlatch both of said latches.

28. In a machine of the class described, the combination with an operating mechanism comprising value keys and special keys, of an autographic attachment to said operating mechanism having feeding devices, a manipulative device for operating the feeding devices, a normally inaccessible receptacle, and adjustable means whereby to render said receptacle accessible there may be required only the operation of any of the aforesaid keys, or the operation of any key and the manipulative device, or the operation of a special key and said manipulative device.

In testimony whereof I affix my signature in the presence of two witnesses.

JOHN A. WERNER.

Witnesses:
  CARL W. BEUST,
  R. RUMMLER.

Copies of this patent may be obtained for five cents each, by addressing the "Commissioner of Patents, Washington, D. C."